United States Patent
Kizhakkepat et al.

(10) Patent No.: US 11,020,910 B2
(45) Date of Patent: Jun. 1, 2021

(54) SYSTEM AND METHOD OF CONSTRUCTING COMPOSITE STRUCTURES WITHOUT TOOLING DAMS

(71) Applicant: Bell Helicopter Textron Inc., Fort Worth, TX (US)

(72) Inventors: Amarjit Olenchery Kizhakkepat, Fort Worth, TX (US); Tyler Wayne Baldwin, Keller, TX (US); Edward Wei-Yueh Lee, Arlington, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 367 days.

(21) Appl. No.: 15/153,826

(22) Filed: May 13, 2016

(65) Prior Publication Data

US 2017/0326808 A1    Nov. 16, 2017

(51) Int. Cl.
| | |
|---|---|
| *B29C 70/54* | (2006.01) |
| *B29C 65/02* | (2006.01) |
| *B29C 70/34* | (2006.01) |
| *B29L 31/30* | (2006.01) |

(52) U.S. Cl.
CPC ............ *B29C 65/02* (2013.01); *B29C 70/342* (2013.01); *B29C 70/54* (2013.01); *B29C 70/545* (2013.01); *B29C 2793/009* (2013.01); *B29C 2793/0027* (2013.01); *B29L 2031/3076* (2013.01)

(58) Field of Classification Search
CPC ....... B29C 70/30; B29C 70/38; B29C 70/386; B29C 70/34; B29C 70/54
See application file for complete search history.

(56) References Cited

U.S. PATENT DOCUMENTS

| 4,568,245 A | * | 2/1986 | Hibyan | ................... B64C 27/32 416/134 A |
|---|---|---|---|---|
| 5,954,898 A | * | 9/1999 | McKague | ............. B29C 70/342 156/182 |
| 6,168,358 B1 | | 1/2001 | Engwall et al. | |
| 2008/0145615 A1 | | 6/2008 | Jacobsen et al. | |

(Continued)

FOREIGN PATENT DOCUMENTS

| EP | 2886311 A1 | 6/2015 |
|---|---|---|
| EP | 32487631 A1 | 11/2017 |
| JP | 402162026 A | 6/1990 |

OTHER PUBLICATIONS

European Patent Office, European Search Report for EP Appl. No. 16173196.3 dated Oct. 30, 2017, 4 pp.

(Continued)

*Primary Examiner* — Scott W Dodds
(74) *Attorney, Agent, or Firm* — Edwin S. Flores; Daniel J. Chalker; Chalker Flores, LLP (57) ABSTRACT

The present invention includes methods of preparing a composite structure comprising: placing a first ply of a fibrous material with a curable material on a layup tool; adding one or more additional plies on the first ply, wherein each of the one or more additional plies has a perimeter that is different in size around the perimeter than a previous ply to form a taper; and curing the composite structure, wherein the curable material is selected to minimize, limit, control, or eliminate the outflow of the curable material along the perimeter of the composite structure during the curing step.

15 Claims, 6 Drawing Sheets

(56) References Cited

U.S. PATENT DOCUMENTS

| | | | | |
|---|---|---|---|---|
| 2009/0206202 A1* | 8/2009 | Bolukbasi | ............... | B64C 1/062 |
| | | | | 244/121 |
| 2009/0246446 A1* | 10/2009 | Backhouse | ............ | F01D 5/147 |
| | | | | 428/76 |
| 2009/0261199 A1* | 10/2009 | McCarville | ............. | B29C 70/30 |
| | | | | 244/117 R |
| 2010/0221119 A1* | 9/2010 | Baskin | .................... | B64C 27/32 |
| | | | | 416/244 R |
| 2011/0116936 A1* | 5/2011 | Hiros | ...................... | B64C 27/32 |
| | | | | 416/244 R |
| 2012/0201683 A1* | 8/2012 | Stamps | ................. | B29C 70/026 |
| | | | | 416/204 R |
| 2014/0010662 A1* | 1/2014 | Duelm | .................... | F01D 5/147 |
| | | | | 416/230 |
| 2015/0106062 A1* | 4/2015 | Chen-Keat | .............. | G06F 17/50 |
| | | | | 703/1 |

OTHER PUBLICATIONS

European Patent Office, Communication pursuant to Article 94(3) EPC for EP Appl. No. 16173196.3 dated Jul. 26, 2019, 6 pp.
European Patent Office, Communication pursuant to Article 94(3) EPC for EP Appl. No. 16173196.3 dated May 25, 2018, 5 pp.
European Patent Office, Communication pursuant to Article 94(3) EPC for EP Appl. No. 16173196.3 dated Feb. 6, 2019, 10 pp.

* cited by examiner

SYSTEM AND METHOD OF CONSTRUCTING COMPOSITE STRUCTURES WITHOUT TOOLING DAMS

CROSS-REFERENCE TO RELATED APPLICATIONS

None.

STATEMENT OF FEDERALLY FUNDED RESEARCH

None.

TECHNICAL FIELD OF THE INVENTION

The present invention relates in general to the field of composite structures, and more particularly, to a method of replacing dams with an innovative ply stackup that creates a profile taper.

BACKGROUND OF THE INVENTION

Composite materials have been employed in the fabrication of a wide variety of components for aircraft, e.g., rotorcraft rotor system components. In comparison to a machined metal forging, composite materials have more favorable fatigue characteristics resulting in longer useful life.

Figure 1:
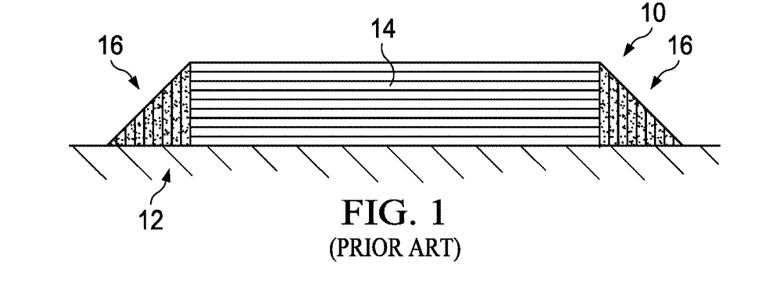
FIG. 1 is a stylized, cross-sectional view illustrating a conventional method for manufacturing a composite part according to the prior art.

Commonly, open-faced tooling is used to form composite parts, in which dams are positioned around the profile of the part. FIG. 1 shows an example of an open-faced tooling set-up, in which a work surface 12 holds the plies 14 of a part 10, wherein a resin embedded in the plies 14 of the part 10 are held by dams 16 that are positioned around the part 10 along the edges of each of the plies 14. Unfortunately, in this set-up, the dams 16 can be expensive and time consuming to make, and they tend to require replacement periodically.

Another manner in which composite parts are made is by curing in a rigid, closed mold that forms the overall shape of the rotor yoke. One of the problems encountered concerning large parts made in a rigid, closed mold is the distortion or "marcelling" of the fibers in the composite part during the curing process. Because the uncured part is forced to conform to the cavity in the mold, mechanical stresses can be induced in the uncured part. The fibers are substantially unconstrained during certain portions of the curing cycle when the resin matrix in which the fibers are disposed is in a semi-liquid or liquid state. The induced stress in the part is relieved via movement or distortion of the fibers within the resin matrix. The fibers can be captured in their distorted or marcelled state when the resin crosslinks in thermosetting composite materials or when the resin is cooled in thermoplastic composite materials.

As such, a need remains for improved methods for making composite parts that eliminate the problems of the prior art.

SUMMARY OF THE INVENTION

In one embodiment the present invention includes a method of preparing a composite structure comprising: placing a first ply of a fibrous material with a curable material on a layup tool; adding one or more additional plies on the first ply, wherein each of the one or more additional plies has a perimeter that is different in size around the perimeter than a previous ply to form a taper; and curing the composite structure, wherein the curable material is selected to minimize, limit, or eliminate the outflow of the curable material along the perimeter of the composite structure during the curing step. In one aspect, the perimeter of each of the one or more additional plies is smaller than the previous ply by about a thickness of the previous ply to form a tapered edge about the perimeter of the composite structure. In another aspect, the perimeter of each of the one or more additional plies is smaller than the previous ply and the taper has a 5 to 90 degree taper, including fractions of degrees, along one or more edges of the composite structure. In another aspect, the perimeter of each of the one or more additional plies is smaller than the previous ply and the taper has a 28 to 60 degree taper along one or more edges of the composite structure. In another aspect, the taper comprises a linear taper, a concave taper, a convex taper, a variable shape taper, a complex taper, a pyramidal taper, a trapezoidal taper, an inverse taper, or multiple tapers. In another aspect, the curable material is defined further as a low-flow curable resin that generally does not flow beyond the perimeter of the composite structure under vacuum during the curing step. In another aspect, the fibrous material comprises at least one of a glass fiber, a carbon fiber, a natural fiber, a cellulose fiber, a chemical fiber, a plastic fiber, a ceramic fiber, or a polymeric fiber. In another aspect, the method further comprises cooling the composite structure; transferring the cured composite structure to a machining tool configured to machine the stack; and constructing a final composite component by machining the cured composite structure using the machining tool. In another aspect, the method further comprises forming the composite structure by placing a semi-rigid caul on top of the plies to apply specific pressures at specific locations of the composite structure and without one or more tooling dams along the edge that forms the taper. In another aspect, the composite structure has no external support along one or more sides of the composite structure during the curing step except a vacuum bag or layer. In another aspect, the method further comprises cutting the first ply and the one or more additional plies prior to assembly. In another aspect, the method further comprises cutting the first ply and the one or more additional plies in situ. In another aspect, the method further comprises curing the composite structure includes applying at least one of heat, pressure, and time. In another aspect, the plies can be laid up by hand or by machine, but not a fiber placement machine.

Another aspect of the present invention includes a method of preparing a composite structure comprising: obtaining a plurality of fibrous material impregnated plies with a low-flow curable resin or a thermoplastic material, wherein each of the plies has a perimeter and a thickness, wherein each additional ply after the first ply has a perimeter that is different in a total surface area and that forms a tapered edge that is a linear taper, a concave taper, a convex taper, a variable shape taper, a complex taper, a pyramidal taper, a trapezoidal taper, an inverse taper, or has multiple tapers; and curing the composite structure under vacuum and heat conditions that cure the resin, wherein the reduced-flow resin is selected to minimize, limit, or eliminate the outflow of the resin along the perimeter of each ply of the composite structure during the curing step. In one aspect, the perimeter of each of the one or more additional plies has a perimeter that is smaller than the previous ply to form a tapered edge with about a 45 degree taper along one or more edges of the composite structure. In another aspect, the low-flow curable resin or the thermoplastic material comprises a resin that generally does not flow beyond the perimeter of the composite structure under vacuum during the curing step. In another aspect, the fibrous material comprises at least one of a glass fiber, a carbon fiber, a natural fiber, a cellulose fiber, a chemical fiber, a plastic fiber, a ceramic fiber, or a polymeric fiber. In another aspect, the method further comprises cooling the composite structure; transferring the cured composite structure to a machining tool configured to machine the stack; and constructing a final composite component by machining the cured composite structure using the machining tool. In another aspect, the method further comprises forming the composite structure by placing a semi-rigid caul on top of the plies to apply specific pressures at specific locations of the composite structure and without one or more tooling dams. In another aspect, the composite structure has no external support along one or more sides of the composite structure or a top of the composite structure during the curing step except a vacuum bag or layer. In another aspect, the plies of the composite structure are pre-cut prior to assembly.

In yet another embodiment the present invention includes a method of preparing a composite structure without a tooling dam comprising: obtaining a plurality of fibrous material impregnated plies with a low-flow curable resin or a thermo-plastic material, wherein each of the plies has a perimeter and a thickness, wherein each additional ply after the first ply has a perimeter or a surface area that is smaller or larger than a perimeter or a surface area of a previous ply, wherein each ply has about the same thickness, wherein the sides of the plies forms a tapered edge between about 5 and 90 degrees or has a complex shape; placing a rigid or semi-rigid caul on top of the plies of the composite structure; and curing the composite structure under vacuum and heat conditions that cure the resin or thermo-plastic material, wherein the low-flow curable resin or thermo-plastic material is selected to minimize, limit, or eliminate the outflow of the resin along the perimeter of each ply of the composite structure during the curing step. In another aspect, the taper comprises a linear taper, a concave taper, a convex taper, a variable shape taper, a complex taper, a pyramidal taper, a trapezoidal taper, an inverse taper, or multiple tapers.

BRIEF DESCRIPTION OF THE DRAWINGS

The novel features believed characteristic of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

DETAILED DESCRIPTION OF THE INVENTION

While the system of the present application is susceptible to various modifications and alternative forms, specific embodiments thereof have been shown by way of example in the drawings and are herein described in detail. It should be understood, however, that the description herein of specific embodiments is not intended to limit the present application to the particular forms disclosed, but on the contrary, the intention is to cover all modifications, equivalents, and alternatives falling within the spirit and scope of the present application as defined by the appended claims.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Illustrative embodiments of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This invention is generally in the field of composite parts or structures, e.g., those that are assembled by hand or by machine, and relates specifically to flexible design method for composite parts or structures that results in use of fewer tools in the manufacturing, shortens program schedules, and reduces cost. This invention can be used on all composite parts thick or thin that uses open cavity tooling. In certain non-limiting examples, the method is suited for thicker composite parts that have hundreds of plies.

The system of the present application can be used to make, e.g., a composite rotor yoke for a rotorcraft. In one embodiment, the composite rotor yoke is laid-up using an automated fiber placement process, but may also be laid-up by hand. After curing, the cured composite rotor yoke may be machined to add any desired features.

Hard tools, a.k.a dams, placed around the perimeter of composite parts produce net molded part planar geometry. In certain embodiments dams are not necessarily hard and can be made of silicon or other rubbery materials. Precision machining of such tools consumes valuable schedule and significant budget for most composite development programs. In a typical development program, machining of high dollar and long lead-time tools commences after successful completion of critical-design-review (CDR) of the parts. After that point, the part geometry is fixed, and any changes to the part geometry that would change the tool geometry are discouraged. This invention disclosure proposes a design method that eliminates the need for perimeter tooling or coffins for composite part manufacturing. By doing so, it eliminates those physical toolings from the part build tooling family; it shortens the program schedule, reduces the budget requirement and makes design changes viable after CDR without imparting negative impact to the program. It also introduces additional error proofing during layup by preventing ply layup at wrong levels.

The present invention incorporates a tapered edge to the composite part as a design improvement (feature) that eliminates the need for dams. Previous methods have relied on metallic tooling dams, which introduce additional complexities during cure. Using a yoke as a non-limiting example, the present invention includes a novel tooling approach that uses tapered edges to achieve the same effect as a dam without the use of an actual dam tool.

Uncured low-flow composite materials for use with the present invention include, but are not limited to, glass or other fibers disposed in an uncured epoxy, in the form of a prepreg, although the present application contemplates other materials for the composite structure, such as a molded rotor yoke. The present invention can also use thermo-plastic materials. An example of low-flow composite material is HexPly® 8552 made by Hexcel Composites. For this application, the term "prepreg" is typically sheets of fibers impregnated in uncured epoxy or adhesive. Uncured low-flow composite material can then be cut to size and laid onto the tool, either by hand or with fiber placement machine. Low-flow composite material can be used in the absence of high-flow adhesive, and could be any composite material that has such a high viscosity that could possibly produce marcels when subjected to a curing process inside, e.g., a closed cavity tool. The method of the present invention allows for the formation of the composite structure without the use of any tooling dams. Further, the present invention is able to eliminate "marcels", which are wrinkles in the fiber structure of a composite that severely compromise the structural integrity of a composite part. Marcels are often created when low-flow composite material, if used in the absence of high-flow adhesive, is forced to conform to inside surfaces of a closed cavity tool, causing the highly viscous epoxy to flow and distort fibers. Complete curing of the distorted fibers, or marcels, causes the fibers to be permanently fixed in the marcelled state. In certain embodiments, a low flow resin system is not required with the present invention. For example, a high flow resin system can also be used with the present invention.

The method can also be modified for the use of high-flow materials. For high-flow materials, the process takes into account resin flow or resin bleed to help extract volatiles from a part during curing. The process is modified to include tooling and bagging that allows the resin to flow out and away from the part as it is cured. All other tooling and the process for low-flow, intermediate-flow, and high-flow material processing for use with the present invention is the same.

As such, the skilled artisan will understand that certain specific materials are listed herein, however, following the teachings herein other equivalent materials from different sources or manufacturers can be used with the present invention. A non-limiting material for use with the present invention, and for which there are numerous known equivalents includes, for example, the low-flow material: HEXPLY® 8552. A non-limiting example of a high-flow material for use with the present invention, and for which there are numerous known equivalents includes, for example, the high-flow material: CYCOM® E773. In another non-limiting example, an intermediate-flow material can be used. For example, certain intermediate-flow materials begin as a high-flow material, that when exposed to high temperature, becomes intermediate-flow, and eventually a low flow material. In this example, the temperature will generally be near and above the resin glass-transition temperature. The present invention can also use a wet layup, which can be done with any fiber and/or any resin. The wet layup then follows the same stacking and methodology taught herein. A non-limiting example of a thermoplastic, and for which there are numerous known equivalents includes, for example, EPLASTICS® PEEK. Again, the skilled artisan will understand how to select and replace materials within the scope of the invention.

The skilled artisan will also recognize that each of the above non-limiting examples can be considered tape, where all the fibers run in the same direction in a given ply, fabric, where there is a weave pattern of fibers, or chopped fiber, which is either tape or fabric material chopped into pieces and randomly placed to create a randomized ply. Depending on the application, the skilled artisan will recognize that the type and orientation of the fibers in each of the plies can all be of the same type or can be of different combinations depending on the final mechanical characteristics sought in the composite structure.

Figure 2A:
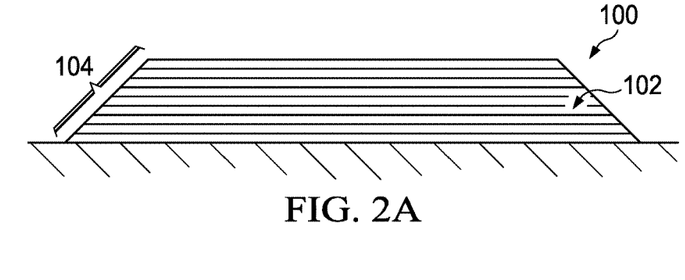
FIG. 2A is a stylized, cross-sectional side-view depicting one example of a method of manufacturing a composite structure according to one embodiment of the present invention.

FIG. 2A is a cross-sectional, side view of one embodiment of the present invention in which a part 100 is shown and in which each of the individual plies 102 is shown that forms a tapered edge 104. In this embodiment, the tapered edge 104 is depicted with each ply having an about 45 degree angle cut with each ply added being smaller around the perimeter of the part 100.

Figure 2B:
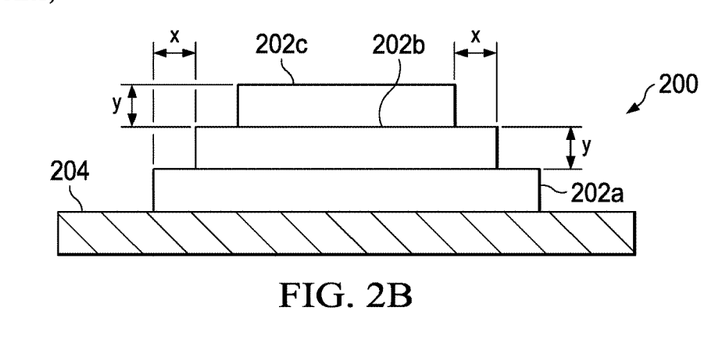
FIG. 2B is a stylized, cross-sectional side-view exploded view depicting another examples of a method of manufacturing a composite structure according to one embodiment of the present invention.

FIG. 2B is a stylized, cross-sectional view depicting a method of manufacturing a composite structure 200 according to one embodiment of the present application, and in which the first three plies 202a, 202b, and 202c, are shown on a lay-up table 204. The skilled artisan will recognize that this is an exploded view of the plies to show certain features, in this case showing the use a pyramidal taper. Each of plies 202*b* and 202*c* are depicted as showing that they are shorter about their perimeter than the prior ply by the width x (which is shown on both sides, therefore the entire perimeter about each ply, 202*b* and 202*c*, is reduced by 2*x*), that is the same distance as the height y as the ply. In this cross-sectional view, the plies 202*a*, 202*b*, and 202*c* form an overall taper that has a 45 degree angle, because the rise and run of the taper is the same (x=y), however, in this figure the edges between plies are cut at 90 degree angles. The skilled artisan will recognize that x=y is just one example of the relationship between the thickness of a ply. For example, there can be a variation of width x that can form an angle between 5 and 90 degrees (including angles there between, e.g., 10, 15, 20, 25, 30, 35, 40, 45, 50, 55, 60, 65, 70, 75, 80, or even 85, and fractional portions of degrees) of the height y (and vice versa), from the total width of one ply in comparison to the subsequent ply, so long as the lower ply is wider than the newly added ply. The angle can be cut into the ply itself along its edge, or the angle can be formed by the combination of plies, while each individual ply may only be cut at, e.g., a right angle, or, the taper can be formed by a combination of both the overall taper and a taper in each ply. Thus, the angle of the taper formed by the combination of the plies will generally be about 45, but will generally vary from, e.g., 28 to a 60 degree angle, and all angles therebetween in 1 degree increments or any fraction of any angle, e.g. 45.75 degrees, and the taper can also vary along the total length of the plies, although often, the angle of the taper will be about the same over the entire width of the composite structure 200 shown in FIG. 2B, and generally, about a 45 degree angle.

One aspect of the selection process of the low-flow resin for use in the composite structure is the reduction or elimination of any bleeding of the resin during the cure process. However, as shown in FIGS. 3A to 3D, the edge of the composite structure can have any of a variety of shapes along the edge. While FIG. 2B shows a stepped pyramid style stack with each ply being smaller than the previous, each of the plies could have one or more tapered angles along its edge, or the overall taper could have a side view as shown in FIGS. 3A to 3D.

Figure 3A:
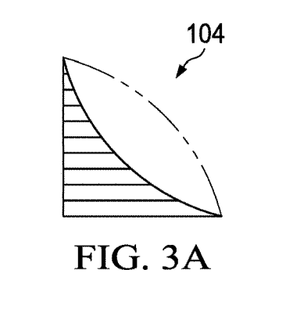
FIGS. 3A to 3D shows stylized, cross-sectional side-views of various edges for the plies (a ply stackup) that shows a profile of the taper for a composite structure of the present invention.
Figure 3B:
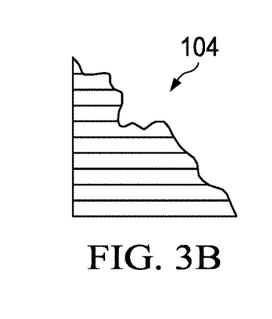
Figure 3C:
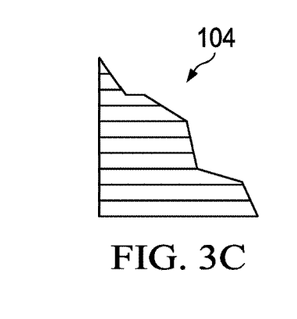
Figure 3D:
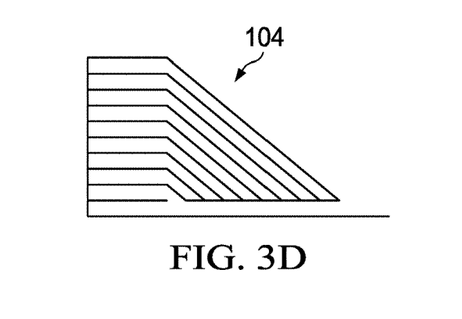

For example, in FIG. 3A the tapered edge 104 formed by all the plies, or of individual plies, is shown having an over tapered angle but also having a concave edge (or could have an overall convex shape along the angle (not shown)). FIG. 3B shows another version of the tapered edge that has a variable contour that has a series of different curves along the tapered edge. FIG. 3C shows another version of the tapered edge having various different angles along the edge of the taper. Finally, FIG. 3D shows yet another embodiment in which each additional ply is progressively longer than a ply lower on the stack and in which the excess material of each ply forms an upside-down dam, which can also be described as an inverse taper. The skilled artisan will recognize that any combination of tapered edges 104 from FIG. 3A to FIG. 3D, or others, can be formed with, and be part of, the present invention.

Figure 4A:
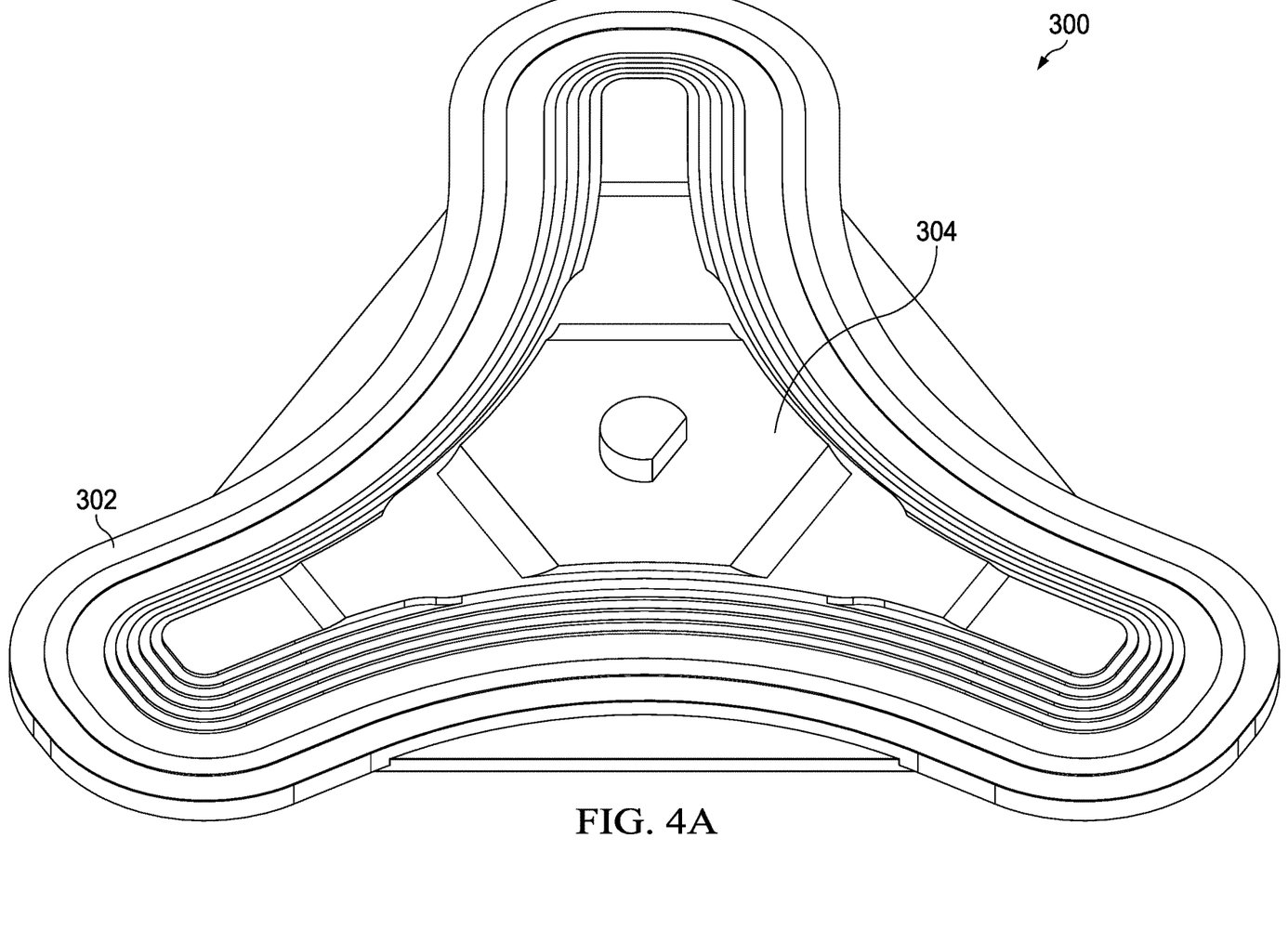
FIG. 4A is a stylized, isometric view of a first step of making a composite structure, in this example a composite molded rotor yoke according to one embodiment of the present invention.
Figure 4B:
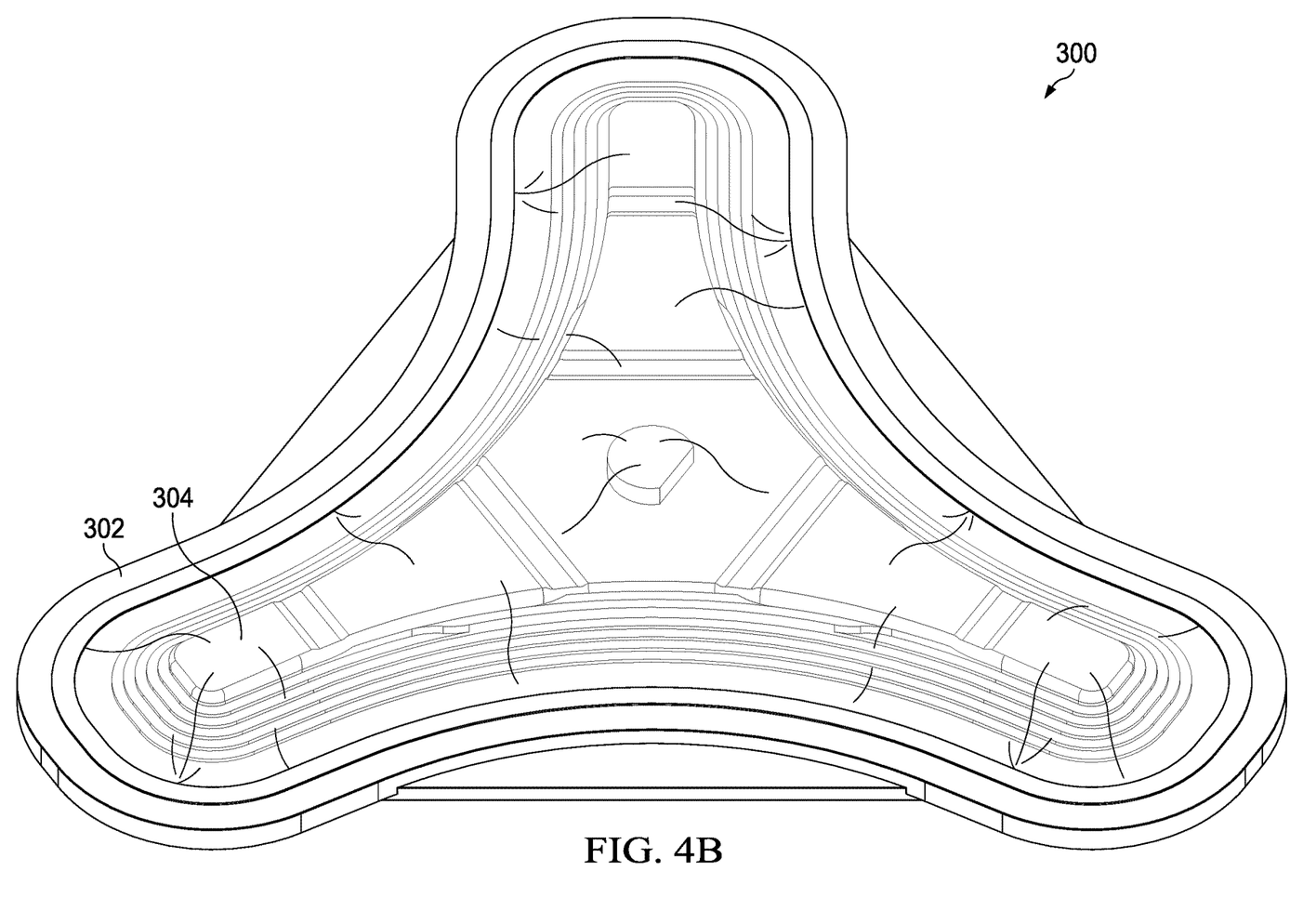
FIG. 4B is a stylized, isometric view of a second step of making the composite structure prior to curing the composite molded rotor yoke according to one embodiment of the present invention.
Figure 4C:
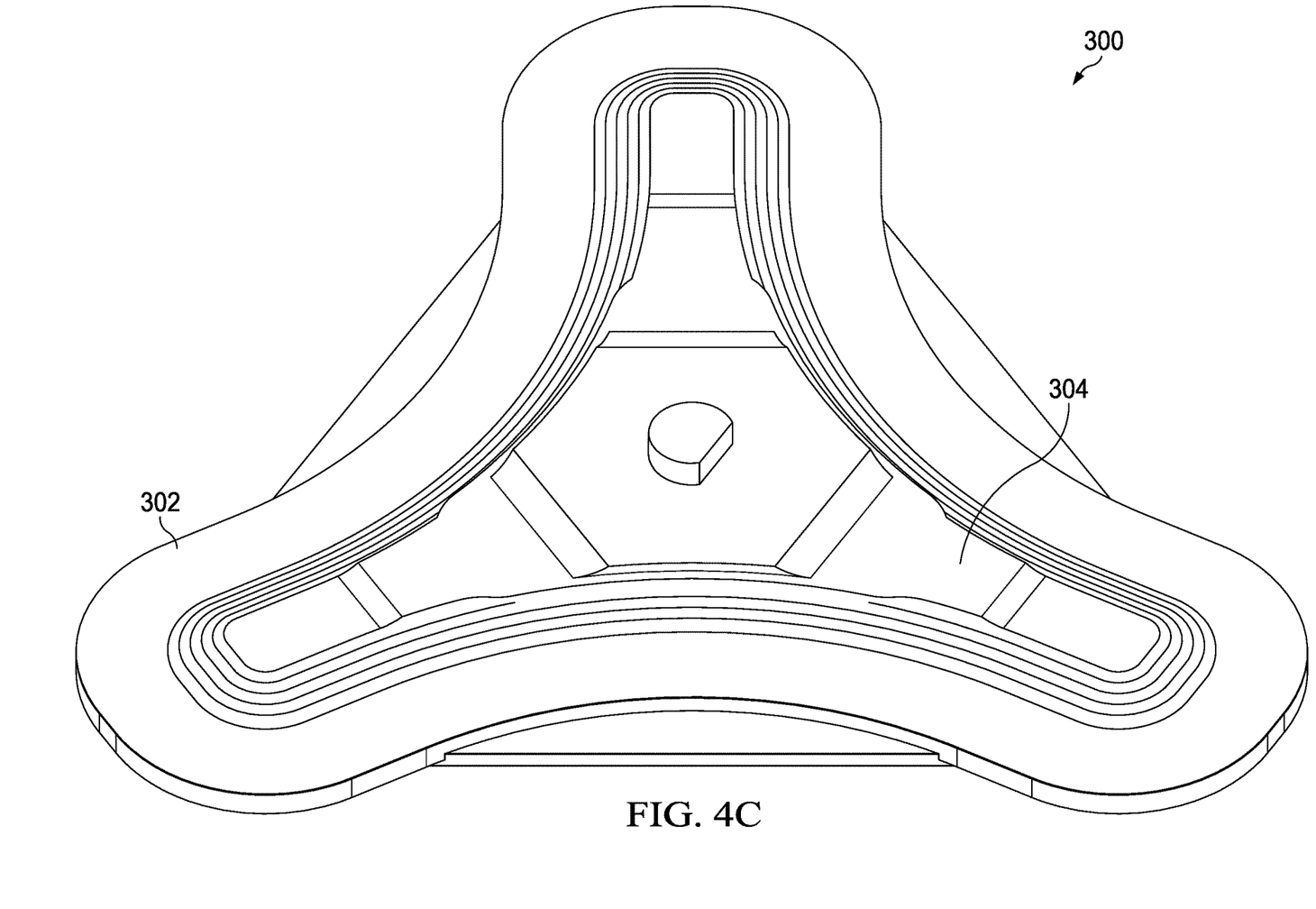
FIG. 4C is a stylized, isometric view of a third step of making the composite molded rotor yoke after the part has been cured according to one embodiment of the present invention.

Referring to FIGS. 4A to 4C in the drawings, an embodiment of a composite structure is a molded rotor yoke 300. In FIG. 4A, the tapered molded rotor yoke 300 is fabricated by applying a plurality of layers of an uncured low-flow composite material on a layup device 302, wherein each of the plies is smaller than each lower ply, and the edges of the molded rotor yoke 300 are tapered, in this example at about a 45 degree angle and on top of the plies is a semi-rigid caul 304. In FIG. 4B, the tapered molded rotor yoke 300 is depicted with a vacuum bag and semi-rigid caul 304 that is fixed onto the layup device 302. FIG. 4C shows the final, cured molded rotor yoke 300 prior to machining under the semi-rigid caul 304.

Figure 5:
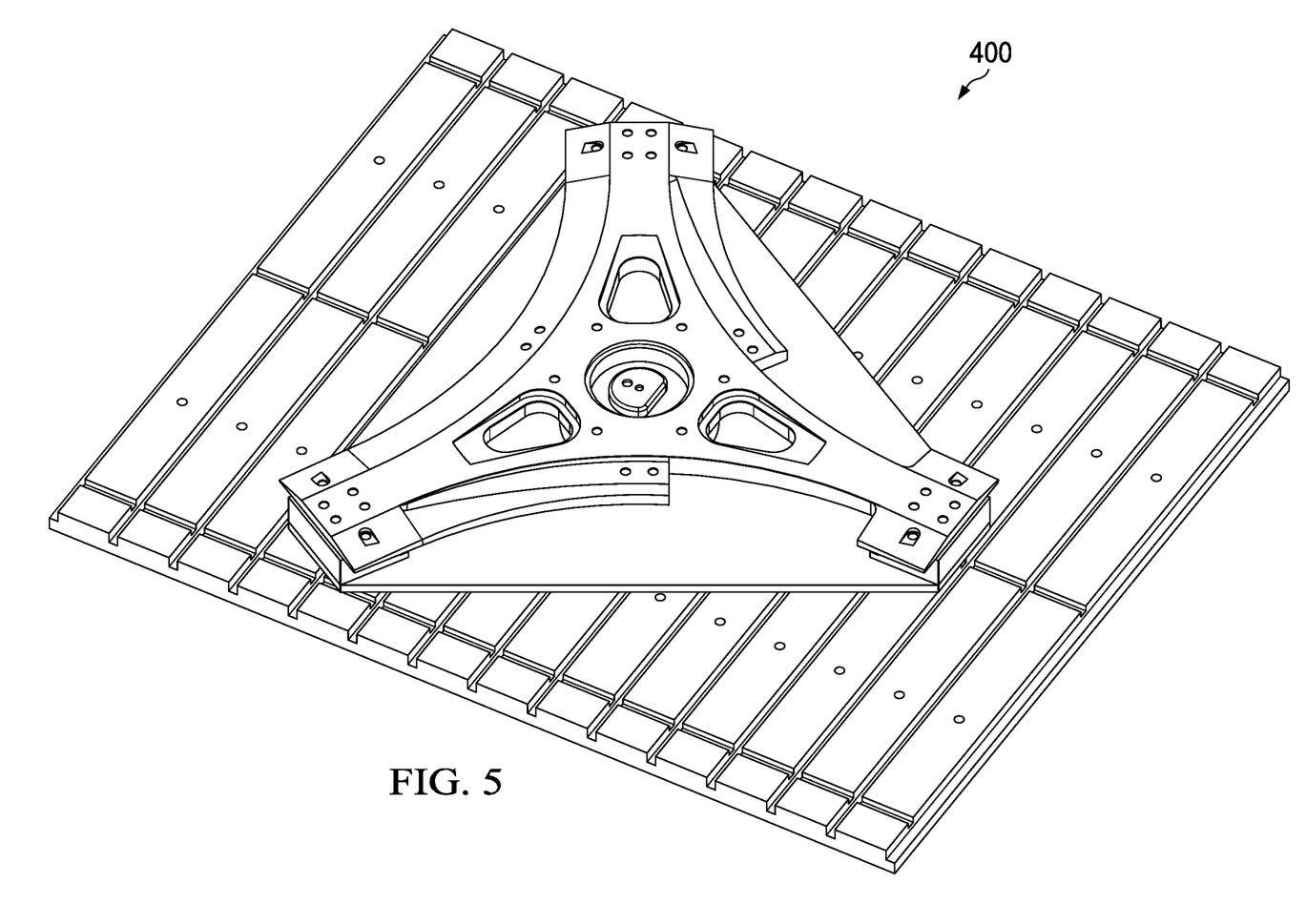
FIG. 5 is a stylized, isometric view of the cured composite molded rotor yoke that has been partially machined according to one embodiment of the present invention.

FIG. 5 is a stylized, isometric view of the cured composite molded rotor yoke 400 according to one embodiment of the present application in which the yoke has been partially machined to eliminate some of the tapered portions of the cured composite molded rotor yoke 400.

Figure 6:
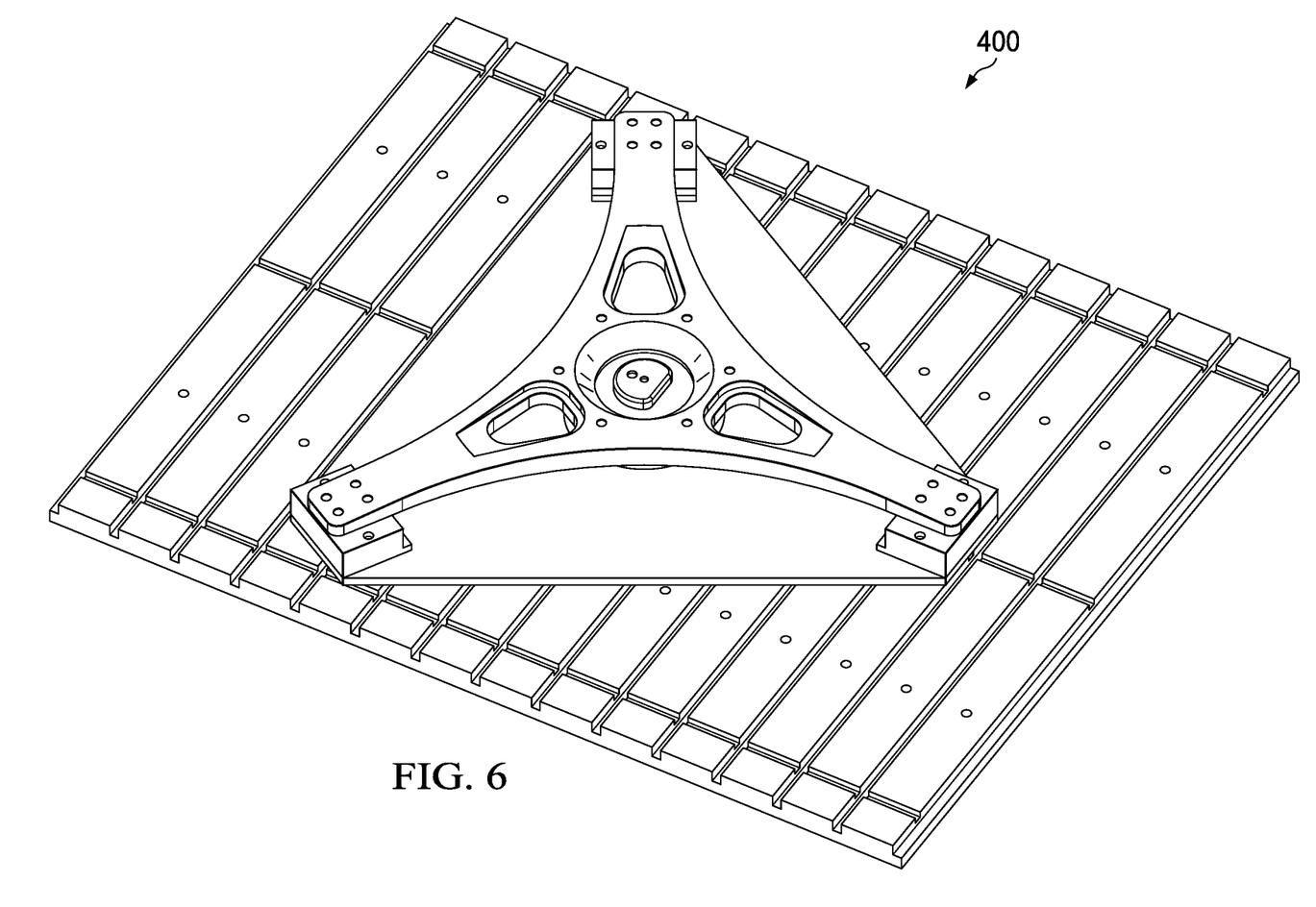
FIG. 6 is a stylized, isometric view of the fully machined rotor yoke according to one embodiment of the present invention.

FIG. 6 is a stylized, isometric view of the completed composite molded rotor yoke 400 according to one embodiment of the present application.

It is contemplated that any embodiment discussed in this specification can be implemented with respect to any method of the invention, and vice versa. Furthermore, various fibrous materials, resins, adhesives, thermoplastic materials and the like can be used to achieve the methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15% from the stated value. For use with the present invention, when referring to the taper, whether it is a symmetrical or asymmetrical (or complex) taper, the angle of the taper can be anything between 5 and 90 degrees, and can include fractions of degrees, in this case, ±1, 2, 3, 4, 5, 6, 7, 10, 12 or 15% of the listed angle.

All of the methods disclosed and claimed herein can be made and executed without undue experimentation in light of the present disclosure. While the methods of this invention have been described in terms of preferred embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of preparing a rotor yoke without forming marcels during curing comprising:
    placing a first ply of a fibrous material impregnated with an uncured low-flow epoxy or resin on a layup tool in the shape of a rotor yoke;
    adding two or more additional single plies impregnated with the uncured low-flow epoxy or resin on the first ply to form the rotor yoke, wherein each of the two or more additional adjacent single plies has a perimeter that is different in size than a previous adjacent single ply to form a taper, and wherein the taper is between about 5 and 90 degrees or has a complex shape; and
    curing the rotor yoke under vacuum without one or more tooling dams, wherein marcels are not formed during the curing step and are eliminated from the rotor yoke, wherein the uncured low-flow epoxy or resin does not outflow beyond the perimeter of the rotor yoke during the curing step, and
    wherein the fibrous material comprises at least one of a glass fiber, a carbon fiber, a natural fiber, a cellulose fiber, a chemical fiber, a plastic fiber, a ceramic fiber, or a polymeric fiber.

2. The method of claim 1, wherein the perimeter of each of the two or more additional single plies is smaller than the previous single ply by about a thickness of the previous single ply.

3. The method of claim 1, wherein the perimeter of each of the two or more additional single plies is smaller than the previous single ply and the taper has a 5 to 90 degree taper, including fractions of degrees, along one or more edges of the rotor yoke.

4. The method of claim 1, wherein the perimeter of each of the two or more additional single plies is smaller than the previous single ply and the taper has a 28 to 60 degree taper along one or more edges of the rotor yoke.

5. The method of claim 1, wherein the taper comprises a linear taper, a concave taper, a convex taper, a variable shape taper, a complex taper, a pyramidal taper, a trapezoidal taper, an inverse taper, or multiple tapers.

6. The method of claim 1, further comprising forming the rotor yoke by placing a semi-rigid caul on top of the single plies to apply specific pressures at specific locations of the rotor yoke.

7. The method of claim 1, wherein the rotor yoke has no external support along one or more sides of the rotor yoke during the curing step except a vacuum bag or layer.

8. The method of claim 1, wherein the step of curing the rotor yoke includes applying at least one of heat or pressure.

9. The method of claim 1, further comprising laying up the single plies by hand or by machine, but not a fiber placement machine.

10. A method of preparing a rotor yoke without marcels comprising:
    obtaining a plurality of single plies comprising a fibrous material impregnated with a low-flow uncured epoxy or resin to form the rotor yoke, wherein each of the single plies in the rotor yoke has a thickness, and the rotor yoke comprises at least three single plies each having a perimeter that is different in a total surface area and wherein the combined perimeters of the single plies form a tapered edge that has a linear taper, a concave taper, a convex taper, a variable shape taper, a complex taper, a pyramidal taper, a trapezoidal taper, an inverse taper, or has multiple tapers, wherein the fibrous material comprises at least one of a glass fiber, a carbon fiber, a natural fiber, a cellulose fiber, a chemical fiber, a plastic fiber, a ceramic fiber, or a polymeric fiber, and wherein the tapered edge is between about 5 and 90 degrees; and
    curing the rotor yoke under vacuum and heat without using tooling dams, wherein marcels are not formed during the curing step and are eliminated from the rotor yoke, and wherein the low-flow uncured epoxy or resin does not outflow along the perimeter of each adjacent single ply of the rotor yoke during the curing step.

11. The method of claim 10, further comprising forming the rotor yoke by placing a semi-rigid caul on top of the single plies to apply specific pressures at specific locations of the rotor yoke.

12. The method of claim 10, wherein the rotor yoke has no external support along one or more sides of the rotor yoke or a top of the composite structure during the curing step except a vacuum bag.

13. The method of claim 10, wherein the single plies of the rotor yoke are pre-cut prior to assembly.

14. A method of preparing a rotor yoke without a tooling dam and marcels comprising:
- obtaining a plurality of single plies comprising fibrous material impregnated with a low-flow uncured epoxy or resin to form a stack, wherein the stack has a perimeter and a thickness, and the stack comprises at least three single plies each having a perimeter or a surface area that is smaller or larger than the perimeter or the surface area of an adjacent single ply in the stack, wherein each single ply has about the same thickness, wherein the sides of the single plies form a tapered edge, wherein the tapered edge is between about 5 and 90 degrees or has a complex shape, and wherein the fibrous material comprises at least one of a glass fiber, a carbon fiber, a natural fiber, a cellulose fiber, a chemical fiber, a plastic fiber, a ceramic fiber, or a polymeric fiber;
- placing a rigid or semi-rigid caul on top of the stack of the rotor yoke; and
- curing the plies of the rotor yoke under vacuum and heat conditions without tooling dams to form the rotor yoke, wherein the low-flow uncured epoxy or resin does not outflow along the perimeter of the stack of the rotor yoke during the curing step, and wherein marcels are not formed during the curing step and are eliminated from the rotor yoke.

15. The method of claim 14, wherein the tapered edge comprises a linear taper, a concave taper, a convex taper, a variable shape taper, a complex taper, a pyramidal taper, a trapezoidal taper, an inverse taper, or multiple tapers.

\* \* \* \* \*